（12）United States Patent
Lee et al.

(10) Patent No.: US 12,451,541 B2
(45) Date of Patent: Oct. 21, 2025

(54) RECHARGEABLE BATTERY PACK

(71) Applicant: SAMSUNG SDI CO., LTD., Yongin-si (KR)

(72) Inventors: Hyeok Lee, Yongin-si (KR); Beomjoo Kim, Yongin-si (KR); Jaeho Kim, Yongin-si (KR); Kilseok Lee, Yongin-si (KR); Du-Seong Jeon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1212 days.

(21) Appl. No.: 17/242,931

(22) Filed: Apr. 28, 2021

(65) Prior Publication Data
US 2021/0384569 A1 Dec. 9, 2021

(30) Foreign Application Priority Data
Jun. 5, 2020 (KR) .................. 10-2020-0068337

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/658* (2015.04); *H01M 50/505* (2021.01); *H01M 10/643* (2015.04); *H01M 10/653* (2015.04); *H01M 10/6554* (2015.04); *H01M 50/204* (2021.01);
(Continued)

(58) Field of Classification Search
CPC ............. H01M 10/613; H01M 10/643; H01M 10/653; H01M 10/6554; H01M 10/6556; H01M 10/658; H01M 50/204; H01M 50/213; H01M 50/224; H01M 50/227;
(Continued)

(56) References Cited

U.S. PATENT DOCUMENTS
2016/0285139 A1* 9/2016 Kimura ............... H01M 10/615
2017/0005382 A1 1/2017 Kim et al.
(Continued)

FOREIGN PATENT DOCUMENTS
CN 106328844 A 1/2017
CN 106876621 A 6/2017
(Continued)

OTHER PUBLICATIONS

Office Action from corresponding Chinese Application No. 202121264413.2, Chinese Office Action mailed Nov. 15, 2021, with English translation (5 pgs.).
(Continued)

*Primary Examiner* — Lingwen R Zeng
(74) *Attorney, Agent, or Firm* — Womble Bond Dickinson (US) LLP

(57) ABSTRACT

A rechargeable battery pack includes: a battery housing including an inner space; a plurality of unit battery cells in the inner space; a bus bar configured to electrically connect unit battery cells of the plurality of unit battery cells; a lower holder unit configured to fix the unit battery cells in the battery housing; and a cooling unit in a bottom plate of the battery housing under the lower holder unit to cool the unit battery cells.

14 Claims, 16 Drawing Sheets

(51) Int. Cl.
   *H01M 10/658* (2014.01)
   *H01M 50/505* (2021.01)
   *H01M 10/643* (2014.01)
   *H01M 10/653* (2014.01)
   *H01M 10/6554* (2014.01)
   *H01M 50/204* (2021.01)
   *H01M 50/213* (2021.01)
   *H01M 50/224* (2021.01)
   *H01M 50/227* (2021.01)
   *H01M 50/242* (2021.01)
   *H01M 50/503* (2021.01)

(52) U.S. Cl.
   CPC ........ *H01M 50/213* (2021.01); *H01M 50/224* (2021.01); *H01M 50/227* (2021.01); *H01M 50/242* (2021.01); *H01M 50/503* (2021.01); *Y02E 60/10* (2013.01)

(58) Field of Classification Search
   CPC ............. H01M 50/242; H01M 50/503; H01M 50/505; Y02E 60/10
   See application file for complete search history.

(56) References Cited

U.S. PATENT DOCUMENTS

| | | | |
|---|---|---|---|
| 2017/0125753 A1 | 5/2017 | Kim et al. | |
| 2017/0162922 A1* | 6/2017 | Sumpf, Jr. | ........ H01M 10/6557 |
| 2019/0252655 A1 | 8/2019 | Zimmermann | |
| 2019/0305395 A1* | 10/2019 | Favaretto | .......... H01M 10/6556 |
| 2020/0083575 A1 | 3/2020 | Yoo et al. | |
| 2020/0243814 A1* | 7/2020 | Kang | .................. H01M 50/264 |
| 2021/0384569 A1 | 12/2021 | Lee et al. | |
| 2022/0013821 A1* | 1/2022 | Tong | ........................ B60L 50/64 |

FOREIGN PATENT DOCUMENTS

| | | |
|---|---|---|
| CN | 110071243 A | 7/2019 |
| CN | 110165100 A | 8/2019 |
| CN | 216648473 U | 5/2022 |
| EP | 3 525 259 A1 | 8/2019 |
| EP | 3 547 398 A1 | 10/2019 |
| JP | 2018-163732 A | 10/2018 |
| KR | 10-2019-0041581 A | 4/2019 |
| KR | 10-2019-0132880 A | 11/2019 |

OTHER PUBLICATIONS

European Search Report from corresponding European Application No. 21177494.8, European Search Report dated Nov. 3, 2021 (7 pgs.).
Chinese Office Action dated Dec. 28, 2022 issued in corresponding Chinese Application No. 202110624671.5, including English translation (23 pages).
Chinese Office Action dated May 20, 2023, issued in corresponding Chinese Application No. 202110624671.5 (16 pages; including 10 pages of English translation).
Chinese Office Action dated Sep. 9, 2023, issued in corresponding Chinese Patent Application No. 202110624671.5 (16 pages, including 10 pages of English translation).
Korean Office Action dated Sep. 18, 2023, issued in corresponding Korean Patent Application No. 10-2020-0068337 (5 pages).

* cited by examiner

RECHARGEABLE BATTERY PACK

CROSS-REFERENCE TO RELATED APPLICATION

This application claims priority to and the benefit of Korean Patent Application No. 10-2020-0068337, filed on Jun. 5, 2020 in the Korean Intellectual Property Office, the entire content of which is incorporated herein by reference.

BACKGROUND

1. Field

Aspects of embodiments of the present invention relate to a rechargeable battery pack.

2. Description of the Related Art

A rechargeable battery can be repeatedly charged and discharged, unlike a primary battery. Small-capacity rechargeable batteries are used in portable small electronic devices, such as mobile phones, notebook computers, and camcorders, while large-capacity rechargeable batteries are used as power sources for driving motors, such as for electric bicycles, scooters, electric vehicles, and forklifts.

The rechargeable battery may be used as one unit battery cell, but may be used as a rechargeable battery pack in which a plurality of unit battery cells are connected in parallel or in series in order to implement a large capacity. For example, the rechargeable battery pack may use a tab for connecting the unit battery cells in series or in parallel, and may have a structure in which a current is drawn from one tab.

In the case of using a plurality of unit battery cells, the rechargeable battery pack should have a structure capable of effectively dissipating heat generated during charging and discharging for high output response, and a structure capable of effectively fixing the unit battery cells in response to shock and vibration.

On the other hand, since the rechargeable battery generates heat when charging and discharging are repeated, there is a problem in that the rechargeable battery may be damaged by heat.

The above information disclosed in this Background section is only for enhancement of understanding of the background of the invention, and, therefore, it may contain information that does not form the prior art that is already known in this country to a person of ordinary skill in the art.

SUMMARY

According to an aspect of embodiments of the present invention, a rechargeable battery pack that has an increased cooling effect and effectively cools heat generated during charging and discharging thereof is provided.

According to one or more embodiments of the present invention, a rechargeable battery pack includes: a battery housing including an inner space; a plurality of unit battery cells in the inner space; a bus bar configured to electrically connect unit battery cells of the plurality of unit battery cells; a lower holder unit configured to fix the unit battery cells in the battery housing; and a cooling unit in a bottom plate of the battery housing under the lower holder unit to cool the unit battery cells.

The lower holder unit may fix a lower surface and a portion of a side surface of the unit battery cells in the battery housing in a state of accommodating the unit battery cells.

The lower holder unit may be formed integrally with the bottom plate of the battery housing to protrude upward, and include a plurality of groove portions to accommodate the lower surface and the portion of the side surface of the unit battery cells.

The rechargeable battery pack may further include a filler between an inner wall surface of the groove portions and the unit battery cells.

The filler may be an electrically insulating thermal glue.

The lower holder unit may include aluminum.

The lower holder unit may include a holder block seated in the inner space and including a plurality of fixing holes into which portions of unit battery cells are inserted.

The fixing holes may be arranged in a plurality of columns and rows in the holder block to insert the lower surface and the portion of the side surface of unit battery cells.

The holder block may include a plastic.

The lower holder unit may include a partition on the bottom plate of the battery housing in a state of being spaced apart from each other to form a plurality of partition spaces.

A plurality of unit battery cells may be accommodated in a state in which the portion of the side surface thereof is in contact with the partition in the partition spaces.

A recess portion that is in surface contact with the unit battery cells may be formed on a side surface of the partition.

The lower holder unit may include a holder body mounted on a lower surface defining the inner space to have a plurality of fixers into which portions of the unit battery cells are inserted, and a plurality of partition ribs may be arranged on the lower surface in a spaced state to form a plurality of partition spaces.

A plurality of unit battery cells may be accommodated in a state in which the portion of the side surface thereof is in contact with the partition in the partition spaces.

A support rib may be formed under the holder body to support lower surfaces of the unit battery cells inserted into the fixers.

The lower holder unit may include a plastic.

The rechargeable battery pack may further include an upper holder unit configured to support the bus bar above the unit battery cells and to have a through-hole through which portions of the unit battery cells are exposed.

The bus bar may include: a pair of first bus bars at opposite edges above the upper holder unit to be electrically connected to the unit battery cells; and a plurality of second bus bars on side surfaces between the pair of first bus bars above the upper holder unit to be electrically connected to the unit battery cells.

The bus bar and the unit battery cells may be electrically connected by a wire member above the upper holder unit.

The cooling unit may include a cooling channel in the bottom plate of the battery housing.

According to one or more embodiments of the present invention, high-temperature heat generated during an operation of the unit battery cells may be transferred to the cooling unit through the lower holder unit. Therefore, it is possible to effectively cool the heat generated during the operation of the unit battery cells by the heat transfer action through the holder unit.

DESCRIPTION OF REFERENCE SYMBOLS

Figure 1:
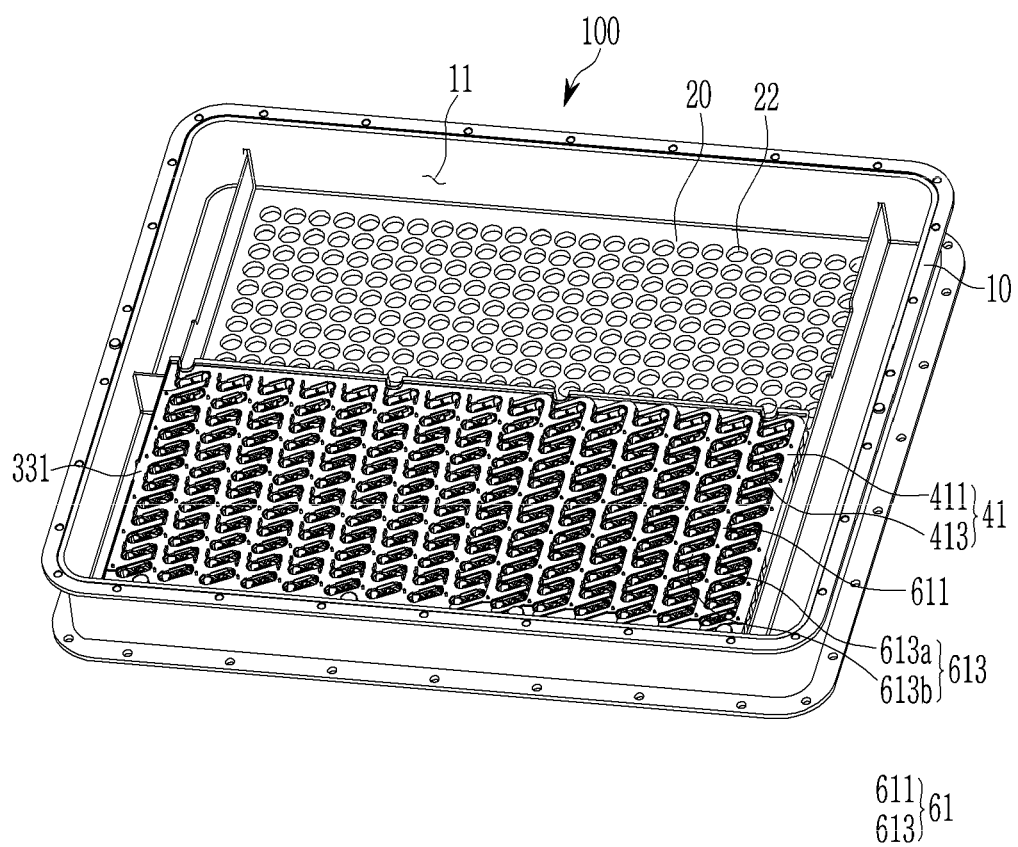
FIG. 1 illustrates a schematic perspective view showing a rechargeable battery pack according to an embodiment of the present invention.

| | |
|---|---|
| 10: battery housing | 11: inner space |
| 20, 120, 220, 320: lower holder unit | 21: unit battery cell |
| 22: groove portion | 24: filler |
| 30: cooling unit | 41: first bus bar |
| 411: first portion | 413: first lead portion |
| 50: wire member | 61: second bus bar |
| 611: second body portion | 613: composite lead portion |
| 613a: second lead portion | 613b: third lead portion |
| 70: guide protrusion | 80: stopper protrusion |
| 315b: insertion groove | 335b: insertion protrusion |
| 321: holder body | 322: fixer |
| 323: partition rib | 324: support rib |

DETAILED DESCRIPTION

Herein, the present invention will be described more fully with reference to the accompanying drawings, in which some example embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

In addition, unless explicitly described to the contrary, it is to be understood that terms such as "comprises," "includes," or "have" used in the present specification specify the presence of stated features, numerals, steps, operations, components, parts, or a combination thereof, but do not preclude the presence or addition of one or more other features, numerals, steps, operations, components, parts, or a combination thereof.

Also, in this specification, it is to be understood that when one component is referred to as being "connected" or "coupled" to another component, it may be connected or coupled directly to the other component or connected or coupled to another component with one or more other components intervening therebetween.

Singular forms are to include plural forms unless the context clearly indicates otherwise.

It is to be understood that, although the terms "first," "second," etc. may be used herein to describe various elements, these elements should not be limited by these terms. These terms are used to distinguish one element from another. For example, a first element could be termed a "second" element, and, similarly, a second element could be termed a "first" element, without departing from the scope of example embodiments of the inventive concept. The terms of a singular form may include plural forms unless the context clearly indicates otherwise.

In addition, terms such as "below," "lower," "above," "upper," and the like are used to describe the relationship of the configurations shown in the drawings. However, the terms are used as a relative concept and are described with reference to the direction indicated in the drawings.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

Figure 2:
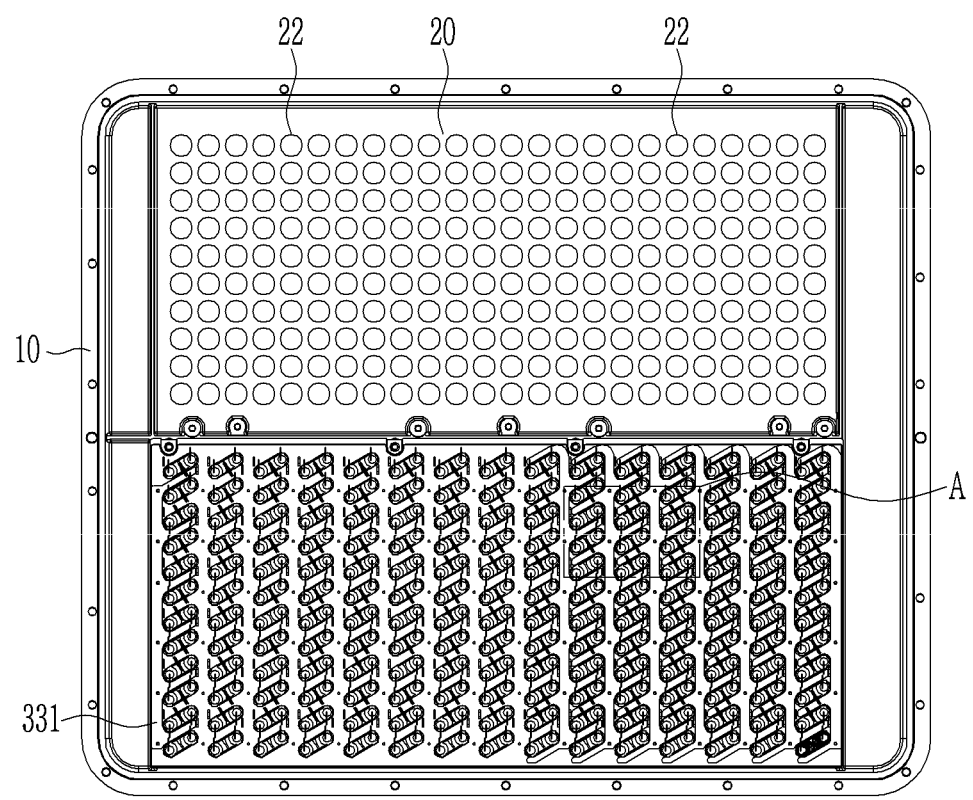
FIG. 2 illustrates a schematic top plan view showing the rechargeable battery pack illustrated in FIG. 1.

FIG. 1 illustrates a schematic perspective view showing a rechargeable battery pack according to an embodiment of the present invention; FIG. 2 illustrates a schematic top plan view showing the rechargeable battery pack illustrated in FIG. 1; and FIG. 3 illustrates a cross-sectional view showing a state in which unit battery cells of the rechargeable battery pack are fixed to a battery housing by a lower holder according to an embodiment of the present invention.

Figure 3:
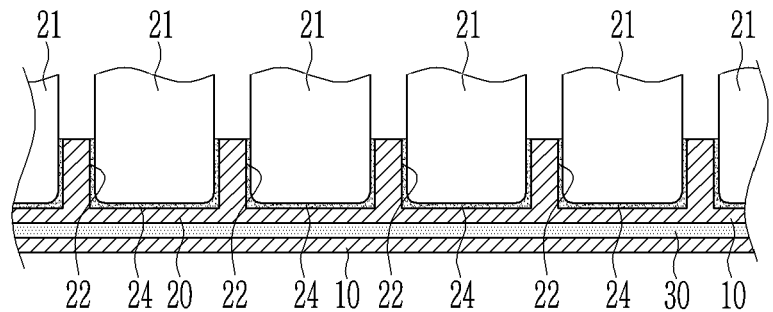
FIG. 3 illustrates a cross-sectional view showing a state in which unit battery cells of the rechargeable battery pack are fixed to a battery housing by a lower holder according to an embodiment of the present invention.

As illustrated in FIG. 1 to FIG. 3, a rechargeable battery pack 100 according an embodiment of the present invention includes: a battery housing 10 configured to have an inner space 11 formed therein; a plurality of unit battery cells 21 inserted into the inner space 11; a lower holder unit 20 configured to fix the unit battery cells 21 inside the battery housing 10; and a cooling unit 30 formed under the lower holder unit 20 to cool the unit battery cells 21.

In an embodiment, the battery housing 10 may have a rectangular parallelepiped shape, and the inner space 11 may be formed therein. The battery housing 10 is described as having the rectangular parallelepiped shape in the present embodiment, but is not limited thereto, and may have any of various shapes, such as a cylindrical shape. The unit battery cells 21 may be accommodated in the inner space 11 of the battery housing 10.

In an embodiment, the battery housing 10 may be sealed by using a cover unit (not illustrated) while accommodating the unit battery cells 21 therein.

The unit battery cells 21 may be formed as conventional cylindrical rechargeable batteries that repeatedly perform charging and discharging.

The unit battery cells 21 may be installed in a state of being supported by the lower holder unit 20 in the battery housing 10 while arranged in a plurality of columns and rows inside the battery housing 10.

The lower holder part 20 may support the unit battery cells 21 inside the battery housing 10, and may support a state in which the unit battery cells 21 are seated inside the battery housing 10.

More specifically, the lower holder unit 20 may be formed in a bottom plate defining the inner space 11 of the battery housing 10 so as to fix each of the unit battery cells 21.

In an embodiment, the lower holder unit 20 may be made of a same material as the battery housing 10 and be integrally formed with the battery housing 10, and may protrude from the bottom plate defining the inner space 11 of the battery housing 10 such that portions of the unit battery cells 21 may be inserted therein. In an embodiment, the lower holder unit 20 may be formed with a groove portion 22 into which a lower surface and a portion of a side surface of the unit battery cells 21 are inserted.

In an embodiment, the groove portion 22 may be formed to have a depth of less than half of a length of the unit battery cells 21 inside the lower holder unit 20.

Accordingly, the unit battery cell 21 may be fixed to the inside of the battery housing 10 in a state of supporting the lower surface and the portion of the side surface thereof while being inserted into the lower holder unit 20.

As such, inserting and fixing the lower surface and the portion of the side surface of the unit battery cells 21 into the inside of the lower holder unit 20 may fix the unit battery cells 21 such that they do not move, and may appropriately cool the unit battery cells 21 by a cooling action of the cooling unit 30 to be described later. This will be described in further detail while describing the cooling unit 30.

The lower holder unit 20 may be formed as a pocket type with a plurality of groove portions 22 formed therein in the bottom plate defining the inner space 11 of the battery housing 10 so as to partially accommodate the unit battery cells 21.

In an embodiment, the lower holder unit 20 may be formed to protrude from the entire bottom plate of the inner space 11 of the battery housing 10, and may be formed as a pocket type by forming a plurality of rows and columns of the groove portions 22.

Accordingly, the unit battery cells 21 may be fixed in position by the lower holder unit 20 by forming a plurality of rows and columns in a state in which portions thereof are inserted into each of the groove portions 22 and other portions thereof protrude to the outside of the groove portions 22.

In an embodiment, a filler 24 may be applied to inner wall surfaces of the groove portions 22 of the lower holder unit 20.

In an embodiment, the filler 24 may be formed by using a thermal glue material that facilitates heat transfer, and may be applied to the inner wall surfaces of the groove portions 22. The filler 24 may be formed by using an adhesive material that facilitates heat transfer and undergoes curing by heat. In an embodiment, the filler 24 is described as being formed by using a thermal glue that facilitates heat transfer and applied to the inner wall surfaces of the groove portions 22, but is not limited thereto, and may be an adhesive material such as a silicone adhesive.

In an embodiment, the lower holder unit 20 may be made of aluminum for high heat transfer efficiency, and may be electrically insulated from the unit battery cells 21. Accordingly, the unit battery cells 21 may be inserted and fixed in the groove 22 in a state of being in contact with the filler 24 without directly contacting the inner wall surfaces of the groove portions 22 of the lower holder unit 20. In addition, it is possible to efficiently cool the unit battery cells 21 since heat transfer to the cooling unit 30 is facilitated while maintaining electrical insulation between the lower holder unit 20 and the unit battery cells 21 due to the thermal glue material having an electrically insulating property of the filler 24.

Accordingly, the unit battery cells 21 may be stably inserted and fixed to the lower holder unit 20 in a state of maintaining durability even when an external shock is transferred by the filler 24.

In an embodiment, the cooling unit 30 may be formed in the battery housing 10 under the lower holder unit 20.

The cooling unit 30 may be formed in the bottom plate of the battery housing 10 below the lower holder unit 20. Herein, the bottom plate of the battery housing 10 is a portion that forms a bottom of the inner space 11. In an embodiment, the cooling unit 30, where a cooling medium water flows, may be formed to have a shape of a cooling passage below the battery housing 10, and, more specifically, inside the bottom plate of the battery housing 10, to appropriately cool the heat generated during the operation of the unit battery cells 21.

The cooling unit 30 may be formed inside the bottom plate of the battery housing 10 at a position corresponding to the groove portions 22 arranged in a plurality of rows and columns.

In an embodiment, the cooling unit 30 may be formed in the shape of a cooling passage having a lattice shape in communication with each other inside the bottom plate of the battery housing 10. However, the cooling unit 30 is not limited to the lattice shape, and may be formed in any of various shapes corresponding to the columns or rows of the groove portions 22.

As such, the cooling unit 30 is formed inside the bottom plate of the battery housing 10, and, thus, the unit battery cells 21 inserted in the lower holder unit 20 may be properly cooled.

In an embodiment, the lower holder unit 20 is formed of aluminum, which is a same material as a material of the battery housing 10, and may accommodate the entire lower surface and the partial side surface of the unit battery cells 21.

Accordingly, a cooling action of the cooling unit 30 is applied to the lower surface and the side surface of the unit battery cells 21 by a heat conduction action of the lower holder unit 20, and, thus, the unit battery cells 21 may be more effectively cooled.

Figure 4:
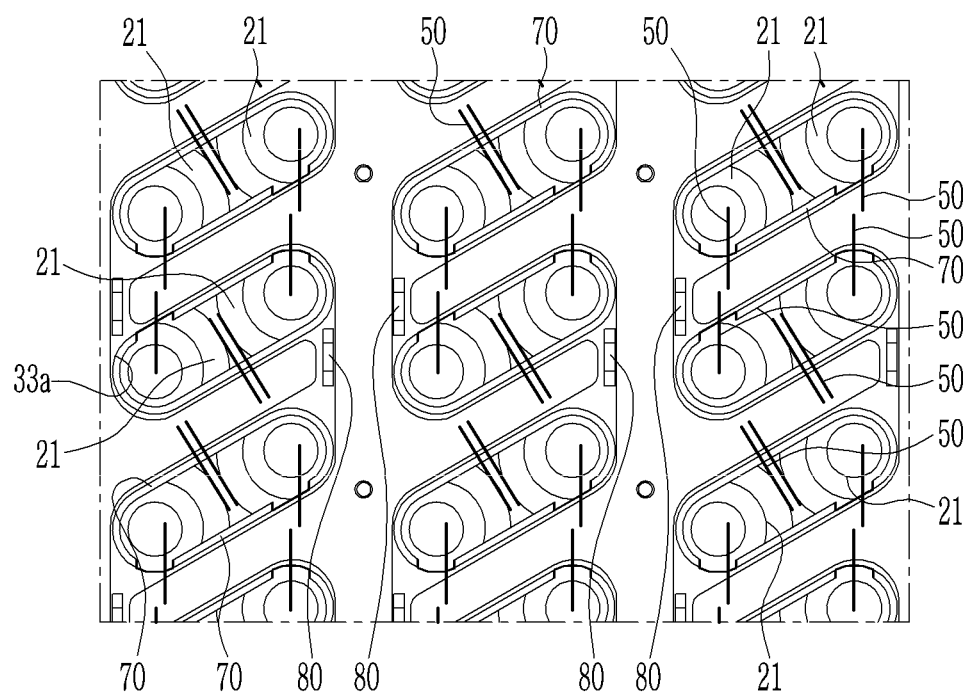
FIG. 4 illustrates a schematic plan view showing a connection state of bus bars in a region "A" of FIG. 2.
Figure 5:
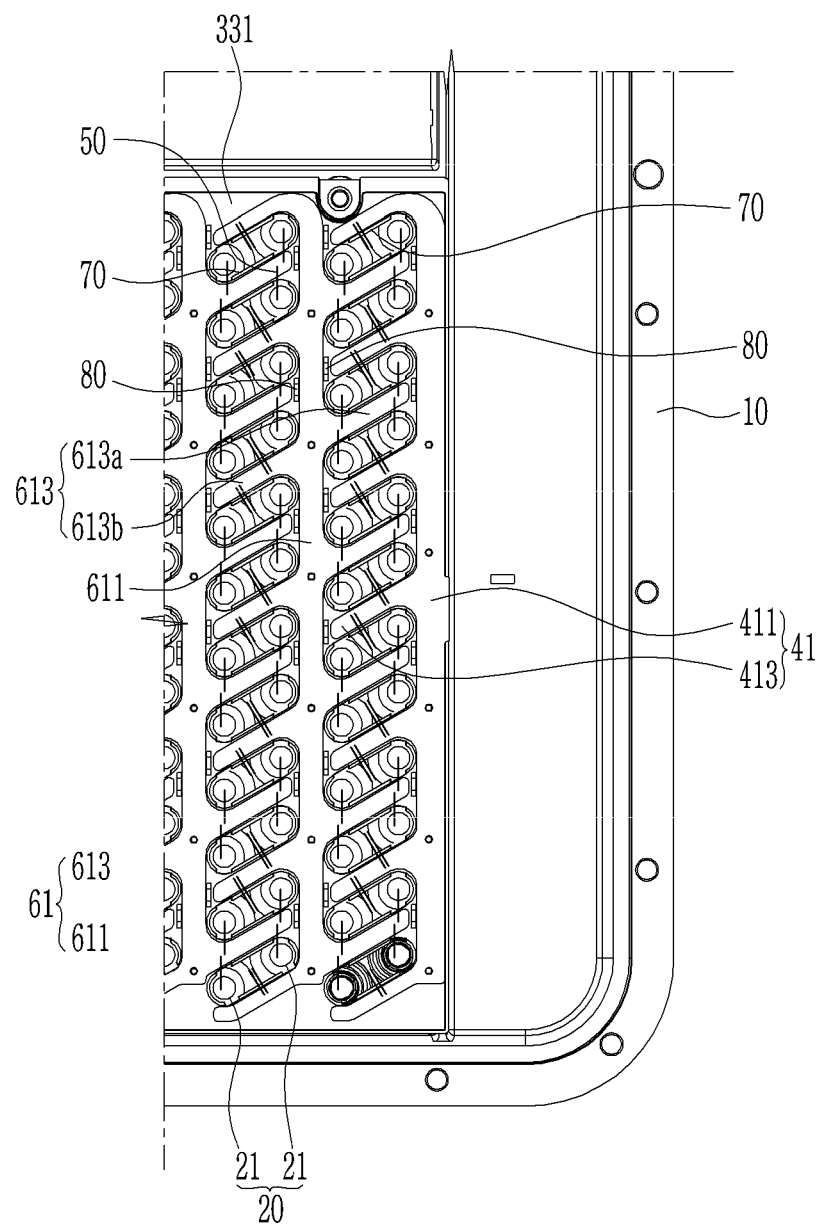
FIG. 5 illustrates a schematic view showing main parts of a connection state of bus bars according to an embodiment of the present invention.
Figure 6:
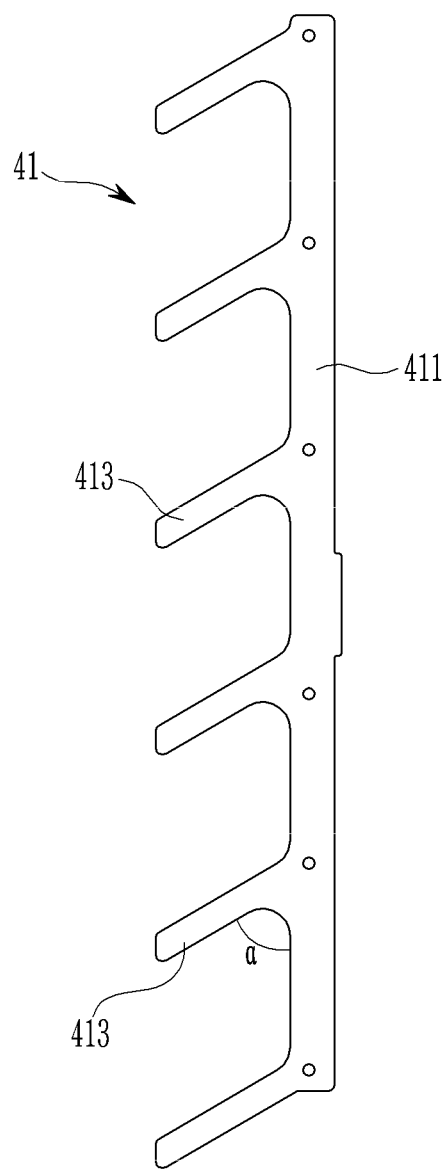
FIG. 6 illustrates a schematic top plan view showing a first bus bar according to an embodiment of the present invention.
Figure 7:
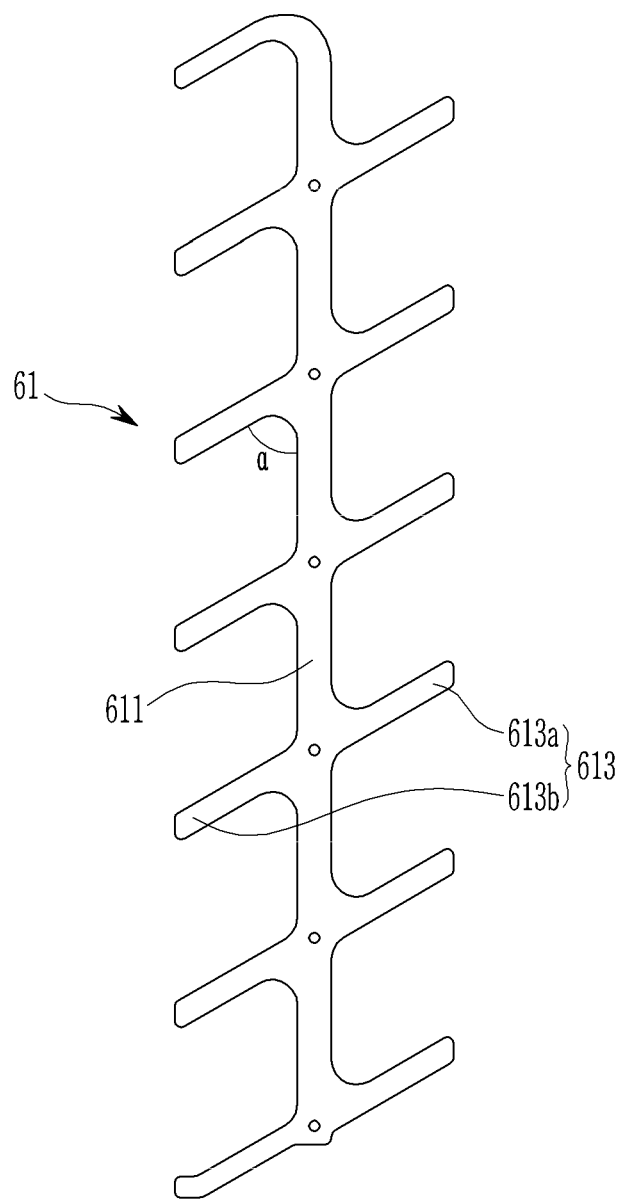
FIG. 7 illustrates a schematic top plan view showing a second bus bar according to an embodiment of the present invention.

FIG. 4 illustrates a schematic plan view showing a connection state of bus bars in a region "A" of FIG. 2; FIG. 5 illustrates a schematic view showing main parts of a connection state of bus bars according to an embodiment of the present invention; FIG. 6 illustrates a schematic top plan view showing a first bus bar according to an embodiment of the present invention; and FIG. 7 illustrates a schematic top plan view showing a second bus bar according to an embodiment of the present invention.

As illustrated in FIG. 4 to FIG. 7, a plurality of bus bars 41 and 61 may be disposed above an upper holder unit 331 to be connected to electrode terminals of the unit battery cells 21.

In an embodiment, the bus bars 41 and 61 may include: a plurality of first bus bars 41 disposed at opposite sides of an upper edge of the upper holder unit 331 to be connected to the electrode terminals; and a plurality of second bus bars 61 disposed on a side surface of the first bus bars 41 at an upper side of the upper holder unit 331 to be connected to the electrode terminals.

The upper holder unit 331 serves to fix an upper portion of the unit battery cells 21 in position, and a plurality of through-holes 33a through which the upper portion of the unit battery cells 21 is partially exposed may be formed therein.

The first bus bars 41 may be installed at opposite edges of the upper holder unit 331 to be electrically connected to the electrode terminals. That is, the first bus bars 41 may be installed at first and second sides of the upper side of the upper holder unit 331, respectively.

Each of the first bus bars 41 may include a first body portion 411 positioned on a side surface of the through-hole 33a at the upper edge of the upper holder unit 331, and a plurality of first lead portions 413 that obliquely protrude from the side surface of the first body portion 411.

The first body portion 411 may be disposed at opposite edges of the upper holder unit 331 in a form extending in a longitudinal direction, and may be disposed on side surfaces of the through-holes 33a formed in rows along opposite sides of the edge of the upper holder unit 331.

The first lead portions 413 may protrude from a side surface of the first body portion 411.

The first lead portions 413 may protrude from the side surface of the first body portion 411 in a direction intersecting an extension direction of the first body portion 411 to be positioned between the through-holes 33a.

The first lead portions 413 may protrude obliquely from the side surface of the first body portion 411. In an embodiment, the first lead portions 413 protrude obliquely at an angle α in a range of 55 degrees to 65 degrees in the extending direction of the first body portion 411, and, for example, may protrude obliquely at an angle of 60 degrees.

In an embodiment, the first lead portions 413 obliquely protruding from the side surface of the first body portion 411 may ensure a stable connection without interference between components in the process of connecting the bus bars to the electrode terminals from the upper side of the upper holder unit 331 by configuring a shape of the bus bars to correspond to a shape in which the unit battery cells 21 are arranged when the unit battery cells 21 are arranged in a zigzag shape to increase space efficiency.

The first lead portions 413 may protrude from the side surface of the first body portion 411, and may protrude to be inserted into positions between the through-holes 33a formed in a first row and a last row along opposite edges of the upper holder unit 331. In an embodiment, the through-holes 33a may be formed in a slit shape penetrating from the upper side of the upper holder unit 331 at an inclination angle corresponding to an inclination angle of the first lead portions 413.

The first lead portions 413 may protrude from the side surface of the first body portion 411 so as to be inserted between two through-holes 33a among the through-holes 33a formed in the first row and the last row and allow second lead portions 613a of the second bus bars 61 positioned adjacent to the first bus bars 41 to be inserted between the through-holes 33a in an alternating arrangement.

In an embodiment, the first lead portions 413 may be connected to the unit battery cells 21 by wire members 50 in a state of being positioned between the through-holes 33a.

The wire members 50 may be connected between the first lead portions 413 and the unit battery cells 21 at the upper side of the upper holder unit 331, and may be electrically connected to the electrode terminals while stably maintaining an installed state of the unit battery cells 21.

The second bus bars 61 may be disposed at positions between the first bus bars 41 in the upper holder unit 331.

The second bus bars 61 may be disposed at positions between the first bus bars 41 disposed at first and second edges of the upper holder unit 331, respectively.

That is, the second bus bars 61 may be disposed at positions between columns in the through-holes 33a formed in the columns and rows.

In an embodiment, the second bus bars 61 may include a second body portion 611 positioned with a long length in a first direction at positions between the through-holes 33a of the upper holder unit 331, and composite lead portions 613 protruding obliquely in a second direction that intersects the first direction from opposite sides of the second body portion 611.

A plurality of second body portions 611 may be formed to have a same or similar length as the first body portion 411, and may be arranged at equal intervals along the first direction at positions between the through-holes 33a at positions between a pair of first body portions 411 disposed at opposite sides of the upper holder unit 331.

The composite lead portions 613 may protrude obliquely from side surfaces of the second body portion 611.

The composite lead portions 613 may include a plurality of second lead portions 613a protruding obliquely in the second direction that intersects the first direction from a first side of the second body portion 611, and a plurality of third lead portions 613b protruding obliquely in a direction that is opposite to the second direction from a second side of the second body portion 611. The composite lead portions 613 may protrude from the respective opposite sides of the second body portion 611 to be inserted into positions between a plurality of rows among the through-holes 33a formed in a plurality of columns and rows at an upper side of the upper holder unit 331.

The second lead portions 613a may protrude from the first side of the second body portion 611 in the second direction that intersects the first direction to be positioned between the through-holes 33a.

In an embodiment, the second lead portions 613a protrude obliquely at an angle α in a range of 55 degrees to 65 degrees at the side surface of the first body portion 611, and, for example, may protrude obliquely at an angle of 60 degrees. In an embodiment, the second lead portions 613a may protrude from the side surface of the second body portion 611 at a same angle and of a same or similar length as the first lead portions 413 of the first bus bar 41.

As such, the second lead portions 613a obliquely protruding from the side surface of the first body portion 611 may ensure a stable connection without interference between components in the process of connecting the bus bars to the electrode terminals from the upper side of the upper holder unit 331 by configuring a shape of the bus bars to correspond to a shape in which the unit battery cells 21 are arranged.

The first lead portions 613a may protrude from the side surface of the first body portion 611, and may protrude so as to be inserted into positions between the through-holes 33*a* formed between the pair of first bus bars 41 disposed at opposite edges of the upper side of the upper holder unit 331.

The second lead portions 613*a* may protrude from the side of the second body portion 611 such that two through-holes 33*a* adjacent to the upper and lower sides are inserted into positions therebetween among the through-holes 33*a* formed in a plurality of columns and rows.

This allows the second lead portions 613*a* of the second bus bars 61 positioned adjacent to the second bus bars 61 to be inserted into positions between the through-holes 33*a* in an alternating arrangement.

The third lead portions 613*b* may protrude from the second side of the second body portion 611.

The third lead portions 613*b* may protrude from the opposite side surface of the second body portion 611 from which the second lead portions 613*a* protrude.

In an embodiment, the third lead portions 613*b* may protrude from the side surface of the second body portion 611 at a same inclination angle as an inclination angle of the second lead portions 613*a*. In an embodiment, the third lead portions 613*b* form a straight line with the second lead portion 613*a* with the second body portion 611 interposed therebetween, and may protrude from the side surface of the second body portion 611.

In an embodiment, ends of the second lead portions 613*a* and the third lead portions 613*b* may be formed to have a rounded shape. Therefore, it is possible to prevent or substantially prevent concentration of electron charges from occurring at the ends of the second lead portions 613*a* and the third lead portions 613*b* during a process of being electrically connected to the unit battery cells 21.

In an embodiment, the composite lead portions 613 may be connected to the unit battery cells 21 by wire members 50 in a state of being positioned between the through-holes 33*a*.

In an embodiment, a guide protrusion 70 may protrude from the through-hole 33*a*.

The guide protrusion 70, which protrudes upward from an opened edge of the through-hole 33*a*, may protrude in a rounded shape corresponding to a long shape of the through-hole 33*a*. Accordingly, the guide protrusion 70 is formed to protrude from each of the through-holes 33*a*, and, thus, it is possible to stably guide positions of the bus bars 41 and 61 disposed between the through-holes 33*a*.

In an embodiment, a stopper protrusion 80 fixing the positions of the bus bars 41 and 61 may protrude from the upper holder unit 331. In an embodiment, a pair of stopper protrusions 80 may protrude from the upper side of the upper holder unit 331.

As described above, in the rechargeable battery pack 100 of an embodiment, portions of the lower surface and the side surface of the unit battery cells 21 may be properly cooled by a heat conduction action of the cooling unit 30 in a state in which the unit battery cells 21 are fixed by the lower holder unit 20 inside the battery housing 10. Accordingly, cooling efficiency of the unit battery cells 21 of the rechargeable battery pack 100 is improved, and, thus it is possible to improve driving stability of the rechargeable battery pack.

Figure 8:
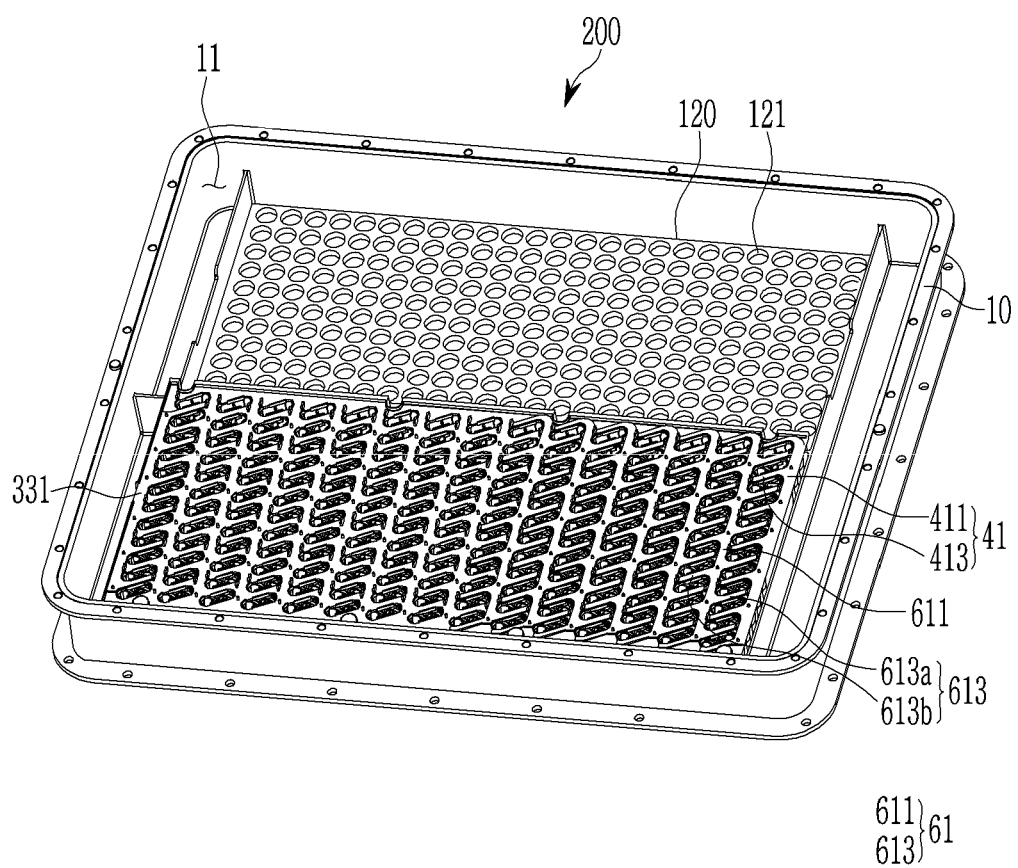
FIG. 8 illustrates a schematic perspective view showing a rechargeable battery pack according to another embodiment of the present invention.
Figure 9:
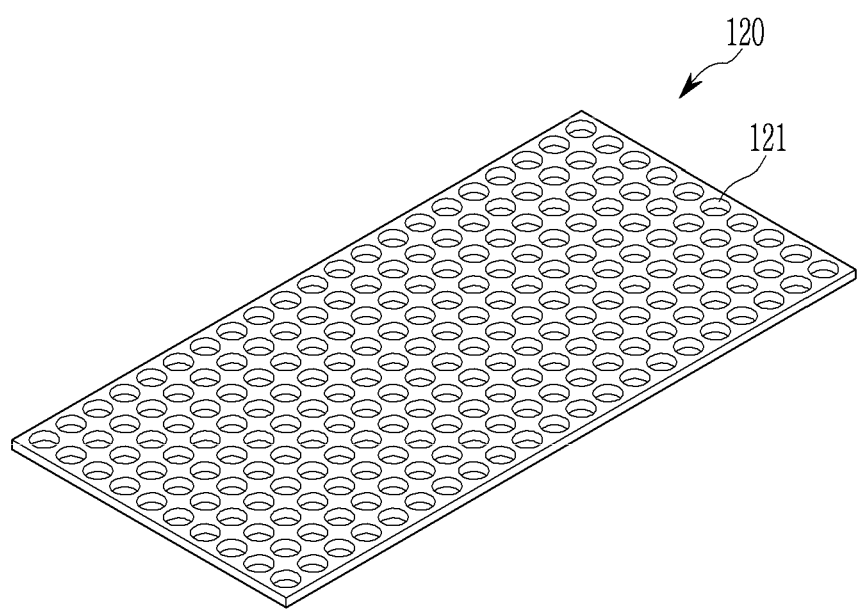
FIG. 9 illustrates a schematic perspective view showing a lower holder of the rechargeable battery pack of FIG. 8.
Figure 10:
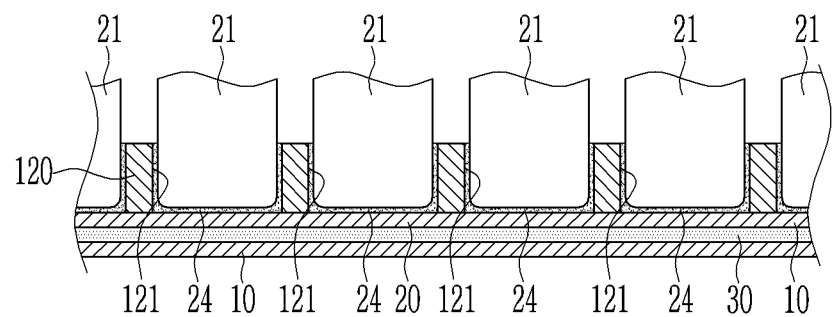
FIG. 10 illustrates a cross-sectional view showing a state in which unit battery cells of the rechargeable battery pack of FIG. 8 are fixed to a battery housing by a lower holder according to an embodiment.

FIG. 8 illustrates a schematic perspective view showing a rechargeable battery pack according to another embodiment of the present invention; FIG. 9 illustrates a schematic perspective view showing a lower holder of the rechargeable battery pack of FIG. 8; and FIG. 10 illustrates a cross-sectional view showing a state in which unit battery cells of the rechargeable battery pack of FIG. 8 are fixed to a battery housing by a lower holder according to an embodiment. The same reference numerals as those of FIG. 1 to FIG. 7 denote the same or similar members having the same or similar functions. Herein, further detailed descriptions of the same reference numerals will be omitted.

As illustrated in FIG. 8 to FIG. 10, according to an embodiment of the present invention, a lower holder unit 120 of a rechargeable battery pack 200 may include a holder block that is seated on the bottom plate of the inner space 11 of the battery housing 10 to have a plurality of fixing holes 121 into which portions of the unit battery cells 21 are inserted. Herein, the lower holder unit and the holder block are described using the same reference numeral.

The holder block 120, which is positioned in a state of being inserted into the battery housing 10, may fix a plurality of unit battery cells 21 which are inserted therein.

In an embodiment, the holder block 120 is formed by using a material that is different from that of the battery housing 10, and in an embodiment, may be formed by using a plastic material capable of securing durability in a state in which the unit battery cells 21 are inserted.

In an embodiment, the holder block 120 may be installed inside the battery housing 10, and an installation position thereof may be fixed by a fastening member (e.g., a predetermined fastening member), such as a bolt member inside the battery housing 10.

The fixing hole 121 into which the unit battery cells 21 are inserted may be formed at an upper portion of the holder block 120.

The fixing hole 121 may be formed by forming a plurality of rows and columns in the holder block 120. In an embodiment, the fixing hole 121 may be formed in the holder block 120 to have a cylindrical shape corresponding to a cylindrical shape of the unit battery cell 21.

The fixing hole 121 may be formed to pass through the holder block 120.

The holder block 120 may be formed to have a height that is smaller than a length of the unit battery cell 21.

Accordingly, the unit battery cells 21 may be inserted into the holder block 120 in a state in which portions thereof are inserted into the fixing hole 121 and remaining portions protrude to the outside of the fixing hole 121.

As such, the unit battery cells 21 are fixed on the bottom plate of the battery housing 10 with the portions thereof inserted into the fixing hole 121 of the holder block 120, and, thus, may be stably positioned while being effectively cooled by the cooling unit 30 formed inside the bottom plate of the battery housing 10.

In an embodiment, a filler 24 may be applied to an inner wall surface of the fixing hole 121.

In an embodiment, the filler 24 may be formed by using an adhesive material that facilitates heat transfer and undergoes curing by heat. In an embodiment, the filler 24 is formed by using a thermal glue that facilitates heat transfer and is applied to the inner wall surfaces of the fixing holes 121, but is not limited thereto, and may be an adhesive material such as a silicone adhesive.

The cooling unit 30 may be formed inside the bottom plate of the battery housing 10. The holder block 120 may be mounted on the bottom plate of the battery housing 10, and heat transfer between the unit battery cells 21 and the cooling unit 30 may be facilitated through the filler 24 between the unit battery cells 21 fixed to the holder block 120 and the bottom plate of the battery housing 10.

Figure 11:
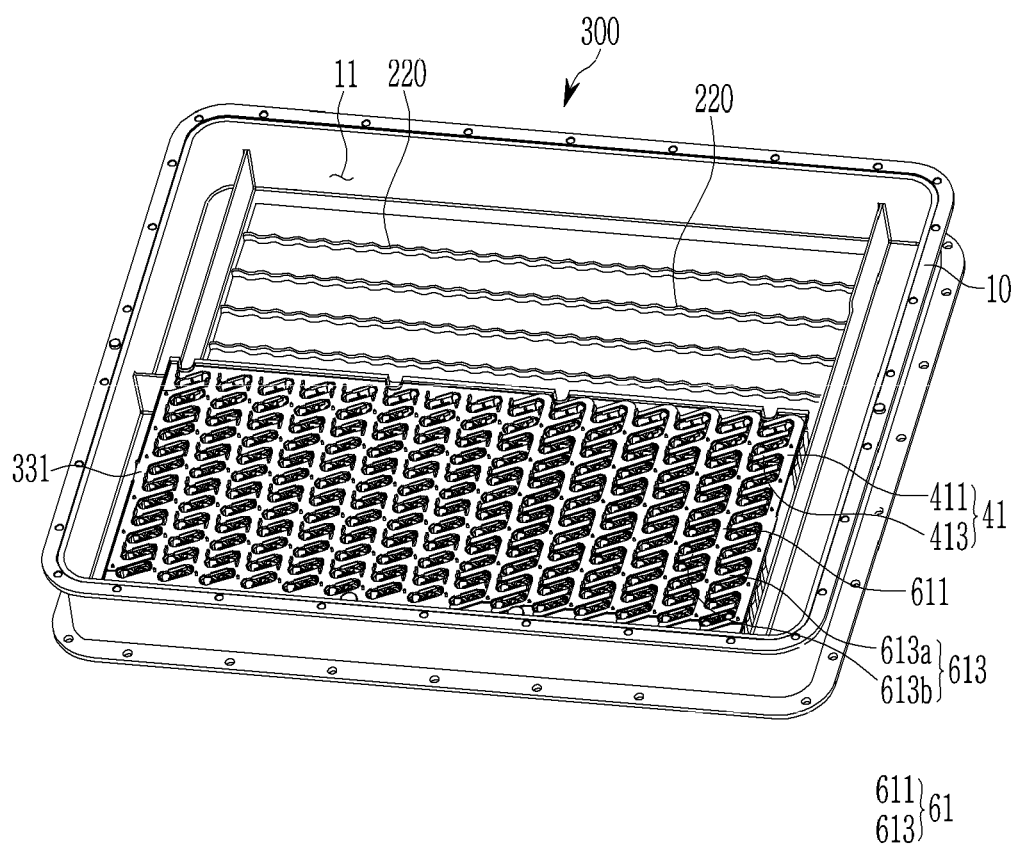
FIG. 11 illustrates a schematic perspective view showing a rechargeable battery pack according to another embodiment of the present invention.
Figure 12:
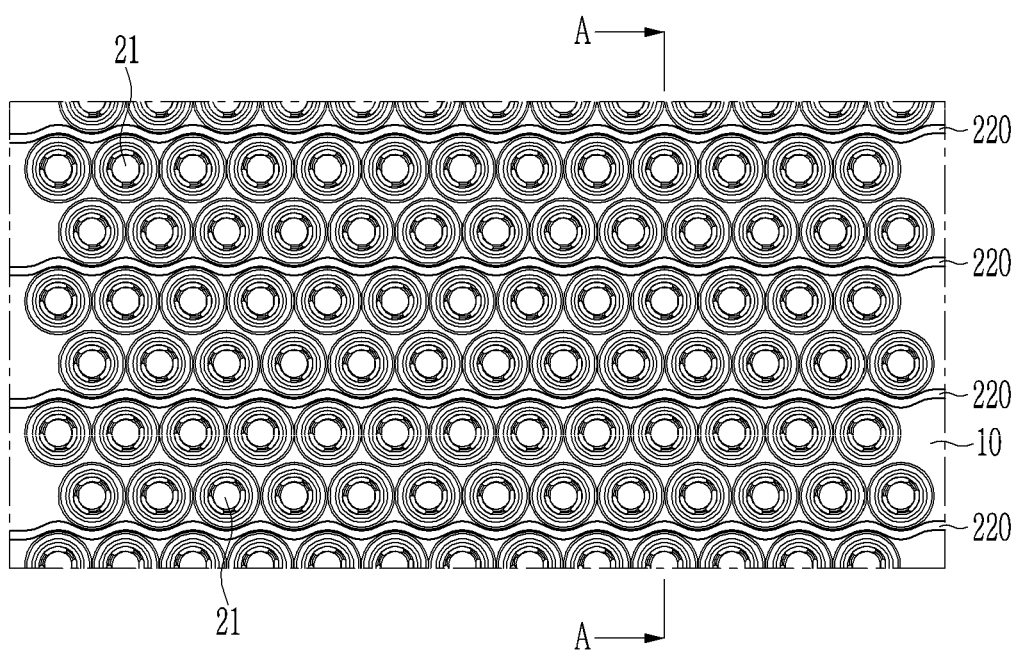
FIG. 12 illustrates a schematic plan view showing a state in which a lower holder is installed in a battery housing of the rechargeable battery pack of FIG. 11.
Figure 13:
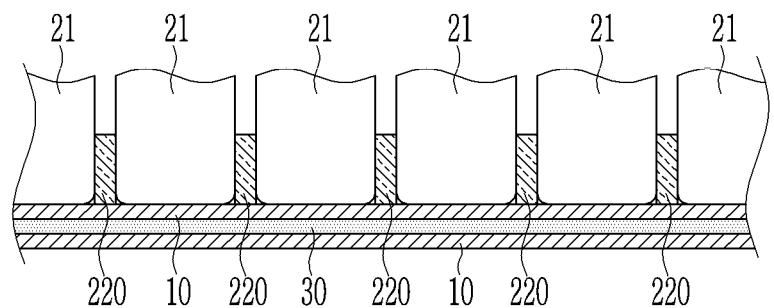
FIG. 13 illustrates a cross-sectional view taken along the line A-A of FIG. 12.

FIG. 11 illustrates a schematic perspective view showing a rechargeable battery pack according to another embodiment of the present invention; FIG. 12 illustrates a schematic plan view showing a state in which a lower holder is installed in a battery housing of the rechargeable battery pack of FIG. 11; and FIG. 13 illustrates a cross-sectional view taken along the line A-A of FIG. 12. The same reference numerals as those of FIG. 1 to FIG. 10 denote the same or similar members having the same or similar functions. Herein, further detailed descriptions of the same reference numerals may be omitted.

As illustrated in FIG. 11 to FIG. 13, according to an embodiment of the present invention, a lower holder unit 220 of a rechargeable battery pack 300 may be formed by using a plurality of partitions that divide the inner space 11 into a plurality of partition spaces on the bottom plate of the battery housing 10. Herein, the lower holder unit and the partitions are described using the same reference numeral.

The partitions 220 may be formed to protrude from the bottom plate of the battery housing 10 to have a long length in a direction while being spaced apart from each other.

A plurality of unit battery cells 21 may be inserted between the partitions 220 to be fixed.

In an embodiment, the partitions 220 may be formed to protrude from the bottom plate of the battery housing 10 to be spaced at equal intervals in a state of being formed with a long length in a direction.

Accordingly, the unit battery cells 21 may be fixed in a state in which the unit battery cells 21 are inserted between the partitions 220.

In an embodiment, a recess portion that is in contact with a side surface of the cylindrical unit battery cells 21 may be formed at a side surface of the partitions 220.

Accordingly, the unit battery cells 21 may be disposed in a state of being close to the recess portion of the partitions 220 while being disposed between the partitions 220, and, thus, may be more stably fixed inside the battery housing 10.

In an embodiment, the partitions 220 may integrally protrude from the bottom plate of the inner space 11 of the battery housing 10 with a height of less than half of a height of the unit battery cells 21.

Accordingly, the unit battery cells 21 may be inserted into the battery housing 10 in a state of being in contact with the bottom plate of the inner space 11 of the battery housing 10 and the side surface of the partitions 220.

In an embodiment, the partitions 220 may be formed by using a same material as that of the battery housing 10, and may be formed by using an aluminum material in an embodiment.

The cooling unit 30 may be formed inside the bottom plate of the battery housing 10.

In an embodiment, the partitions 220 may be formed by using an aluminum material that is the same as that of the battery housing 10, and may be installed in a state of being in contact with a portion of the side surface of the unit battery cells 21.

Accordingly, the lower surface of the unit battery cells 21 is in contact with the bottom plate of the battery housing 10 and a portion of the side surface of the unit battery cells 21 is in contact with the side surface of the partitions 220, and, thus, a cooling action of the cooling unit 30 may act on the lower surface and the portion of the side surface of the unit battery cells 21 to effectively cool the unit battery cells 21.

Figure 14:
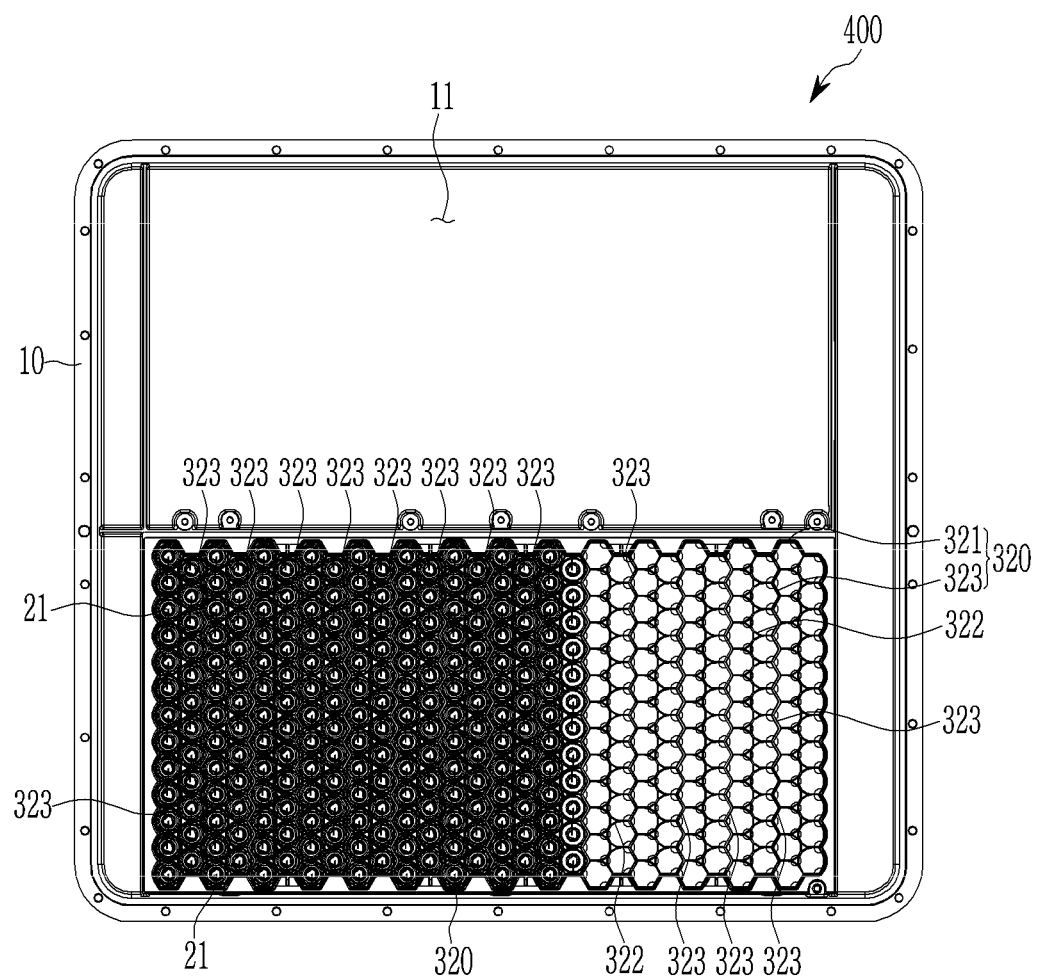
FIG. 14 illustrates a schematic top plan view showing a state in which unit battery cells are inserted into a lower holder of a rechargeable battery pack according to another embodiment of the present invention.
Figure 15:
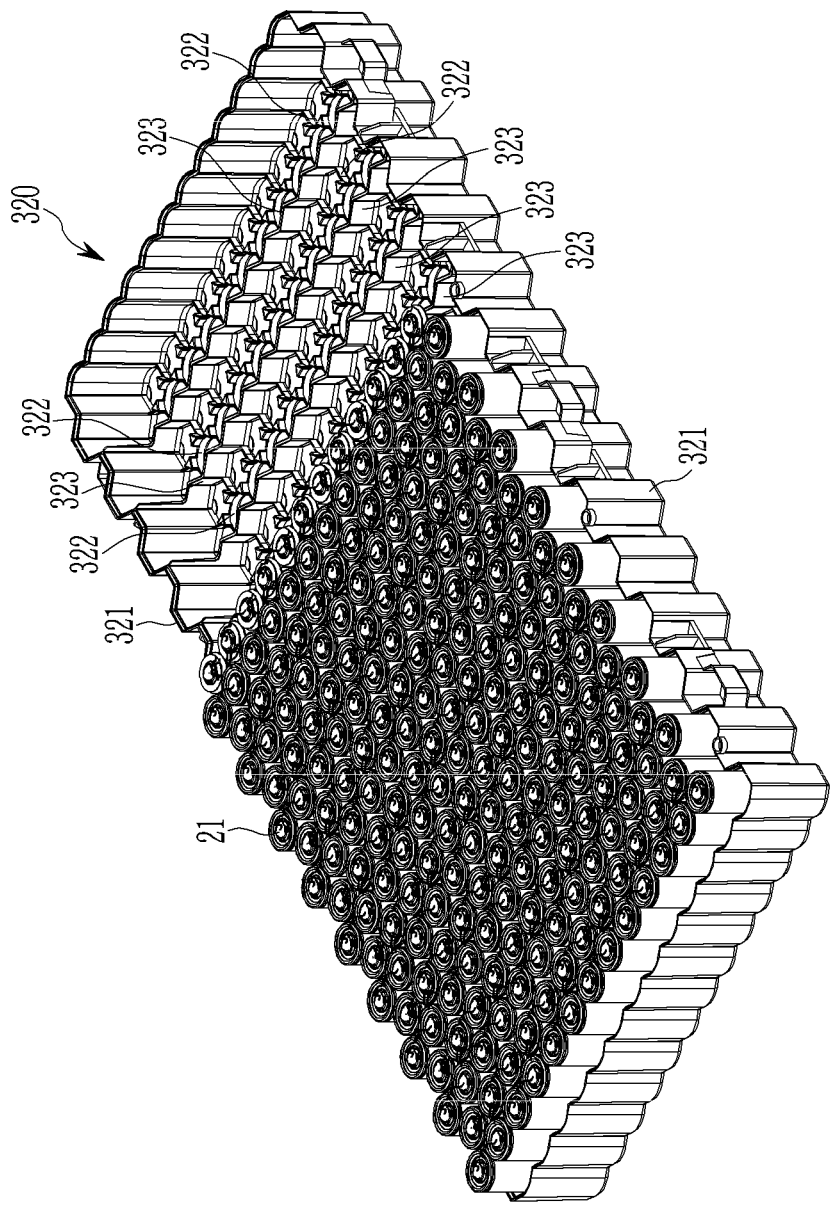
FIG. 15 illustrates a schematic perspective view showing a state in which unit battery cells are inserted into the lower holder of FIG. 14.
Figure 16:
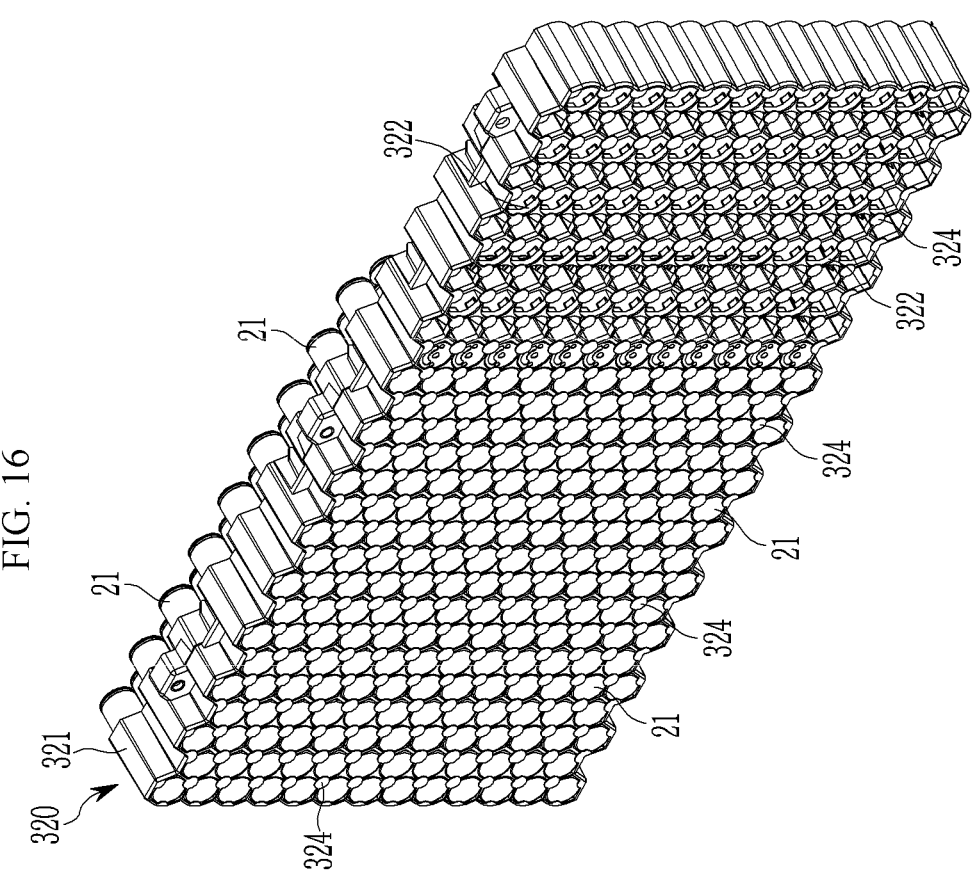
FIG. 16 illustrates a schematic bottom perspective view showing a state in which unit battery cells are inserted into the lower holder of FIG. 15.

FIG. 14 illustrates a schematic top plan view showing a state in which unit battery cells are inserted into a lower holder of a rechargeable battery pack according to another embodiment of the present invention; FIG. 15 illustrates a schematic perspective view showing a state in which unit battery cells are inserted into the lower holder of FIG. 14; and FIG. 16 illustrates a schematic bottom perspective view showing a state in which unit battery cells are inserted into the lower holder of FIG. 15. The same reference numerals as those of FIG. 1 to FIG. 13 denote the same or similar members having the same or similar functions. Herein, further detailed descriptions of the same reference numerals may be omitted.

As illustrated in FIG. 14 to FIG. 16, according to an embodiment of the present invention, a lower holder unit 320 of a rechargeable battery pack 400 may include a holder body 321 seated on the bottom plate of the inner space 11 of the battery housing 10 to have a plurality of fixers 322 into which portions of the unit battery cells 21 are inserted, and partition ribs 323 installed on a lower surface of the holder body 321 in a spaced state to form a plurality of partition spaces.

The fixers 322 into which the unit battery cells 21 are inserted may be formed in the holder body 321. The holder body 321 may be formed by using a plastic material in an embodiment.

The fixers 322, which are formed to have a pocket shape, may be formed on the lower surface of the holder body 321 to accommodate portions of the unit battery cells 21.

Support ribs 324 supporting the lower surface of the unit battery cells 21 that are inserted into the fixers 322 may be formed under the holder body 321.

The support ribs 324 may be formed to have a round shape under the fixers 322 to support the lower surface of the unit battery cells 21. The support ribs 324 are described as having the round shape in an embodiment, but the present invention is not limited thereto, and may have any of various shapes, such as a triangle or a quadrangle.

Accordingly, the support ribs 324 may prevent or substantially prevent the unit battery cells 21 from being separated from lower portions of the fixers 322 or an insulation failure due to direct contact with the bottom plate of the battery housing 10.

In an embodiment, the partition ribs 323 may protrude from the lower surface of the holder body 321 in a state of being formed with a long length in a direction while being spaced apart from each other.

In an embodiment, side surfaces of the partition ribs 323 may be formed in a zigzag shape so as to contact the side surfaces of the cylindrical unit battery cells 21.

Accordingly, the unit battery cells 21 may be disposed in a state of being close to the side surfaces of the partition ribs 323 while being disposed between the partition ribs 323, and, thus, may be more stably fixed inside the battery housing 10.

While the present invention has been described in connection with what are presently considered to be some practical example embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery pack comprising:
a battery housing comprising an inner space;
a plurality of unit battery cells in the inner space;
first and second bus bars arranged at an upper side of the battery housing and electrically connecting unit battery cells of the plurality of unit battery cells, each of the first and second bus bars being connected to each of the unit battery cells;
a lower holder unit configured to fix the unit battery cells in the battery housing; and
a cooling unit in a bottom plate of the battery housing under the lower holder unit to cool the unit battery cells, wherein the lower holder unit fixes a lower surface and a portion of a side surface of the unit battery cells in the battery housing in a state of accommodating the unit battery cells, wherein the lower holder unit comprises aluminum.

2. The rechargeable battery pack of claim 1, wherein the lower holder unit is formed integrally with the bottom plate of the battery housing to protrude upward, and comprises a plurality of groove portions to accommodate the lower surface and the portion of the side surface of the unit battery cells.

3. The rechargeable battery pack of claim 2, further comprising a filler between an inner wall surface of the groove portions and the unit battery cells.

4. The rechargeable battery pack of claim 3, wherein the filler comprises an electrically insulating thermal glue.

5. The rechargeable battery pack of claim 1, wherein the lower holder unit comprises a holder block seated in the inner space and comprising a plurality of fixing holes into which portions of the unit battery cells are inserted.

6. The rechargeable battery pack of claim 5, wherein the fixing holes are arranged in a plurality of columns and rows in the holder block to insert the lower surface and the portion of the side surface of the unit battery cells.

7. The rechargeable battery pack of claim 5, wherein the holder block comprises a plastic.

8. The rechargeable battery pack of claim 1, wherein
the lower holder unit comprises partitions on the bottom plate of the battery housing in a state of being spaced apart from each other to form a plurality of partition spaces, and
the unit battery cells are accommodated in a state in which the portion of the side surface thereof is in contact with a partition of the partitions in the partition spaces.

9. The rechargeable battery pack of claim 8, wherein a recess portion that is in surface contact with the unit battery cells is formed on a side surface of the partition.

10. The rechargeable battery pack of claim 1, wherein
the lower holder unit comprises a holder body mounted on a lower surface defining the inner space and comprising a plurality of fixers into which portions of the unit battery cells are inserted,
a plurality of partition ribs are arranged on the lower surface of the holder body in a spaced state to form a plurality of partition spaces, and
the unit battery cells are accommodated in a state in which the portion of the side surface thereof is in contact with a partition rib of the plurality of partition ribs in the partition spaces.

11. The rechargeable battery pack of claim 10, wherein a support rib is arranged under the holder body to support lower surfaces of the unit battery cells inserted into the fixers.

12. The rechargeable battery pack of claim 1, further comprising an upper holder unit configured to support the bus bar above the unit battery cells and comprising a through-hole through which portions of the unit battery cells are exposed, wherein the first bus bar comprises:
a pair of first bus bars at opposite edges above the upper holder unit to be electrically connected to the unit battery cells; and
the second bus bar comprises:
a plurality of second bus bars on side surfaces between the pair of first bus bars above the upper holder unit to be electrically connected to the unit battery cells.

13. The rechargeable battery pack of claim 12, wherein the first and second bus bars and the unit battery cells are electrically connected by a wire member above the upper holder unit.

14. The rechargeable battery pack of claim 1, wherein the cooling unit comprises a cooling channel in the bottom plate of the battery housing.

* * * * *